(12) United States Patent
Izumi

(10) Patent No.: US 12,552,245 B2
(45) Date of Patent: Feb. 17, 2026

(54) VEHICLE

(71) Applicant: KAWASAKI MOTORS, LTD., Hyogo (JP)

(72) Inventor: Kyohei Izumi, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 786 days.

(21) Appl. No.: 17/900,194

(22) Filed: Aug. 31, 2022

(65) Prior Publication Data
US 2024/0066977 A1   Feb. 29, 2024

(51) Int. Cl.
*B60K 15/04* (2006.01)
*B60K 15/03* (2006.01)
*B60K 15/063* (2006.01)

(52) U.S. Cl.
CPC ........ *B60K 15/04* (2013.01); *B60K 15/03006* (2013.01); *B60K 15/063* (2013.01); *B60K 2015/03026* (2013.01); *B60K 2015/03315* (2013.01); *B60K 2015/0474* (2013.01); *B60K 2015/0638* (2013.01)

(58) Field of Classification Search
CPC .......... B60K 15/04; B60K 15/03006; B60K 15/063; B60K 2015/03026; B60K 2015/03315; B60K 2015/0474; B60K 2015/0638
See application file for complete search history.

(56) References Cited

U.S. PATENT DOCUMENTS

| | | | | |
|---|---|---|---|---|
| 4,817,985 A * | 4/1989 | Enokimoto | .......... | B62D 21/183 280/788 |
| 4,924,959 A * | 5/1990 | Handa | ....... | F02N 3/02 180/908 |
| 7,882,912 B2 * | 2/2011 | Nozaki | ........ | F02M 35/02 180/291 |
| 9,308,813 B1 * | 4/2016 | Egami | ...... | F02M 37/54 |
| 9,932,073 B2 * | 4/2018 | Dube | ....... | B60K 13/02 |
| 2010/0025127 A1 | 2/2010 | Oyobe | | |
| 2014/0158451 A1 * | 6/2014 | Spitz | ...... | B60K 15/06 180/314 |
| 2018/0178866 A1 * | 6/2018 | Kennedy | .......... | B60K 5/1208 |
| 2020/0070650 A1 * | 3/2020 | Lin | ........ | B60K 15/073 |

FOREIGN PATENT DOCUMENTS

JP    2013052722 A  *  3/2013

* cited by examiner

*Primary Examiner* — Jacob D Knutson
(74) *Attorney, Agent, or Firm* — Wenderoth, Lind & Ponack, L.L.P.

(57) ABSTRACT

A vehicle includes a fuel tank in which fuel gas is stored, a cargo bed provided at a rear portion of the vehicle and exposed to the outside of the vehicle, and a connection portion that is connectable to a fuel filling device installed outside the vehicle and supplies the fuel gas supplied from the fuel filling device to the fuel tank. The connection portion is arranged further inward than an outer end in the width direction of the cargo bed. The connection portion includes a filling port into which the fuel filling device is inserted, and the filling port is directed rearward.

14 Claims, 5 Drawing Sheets

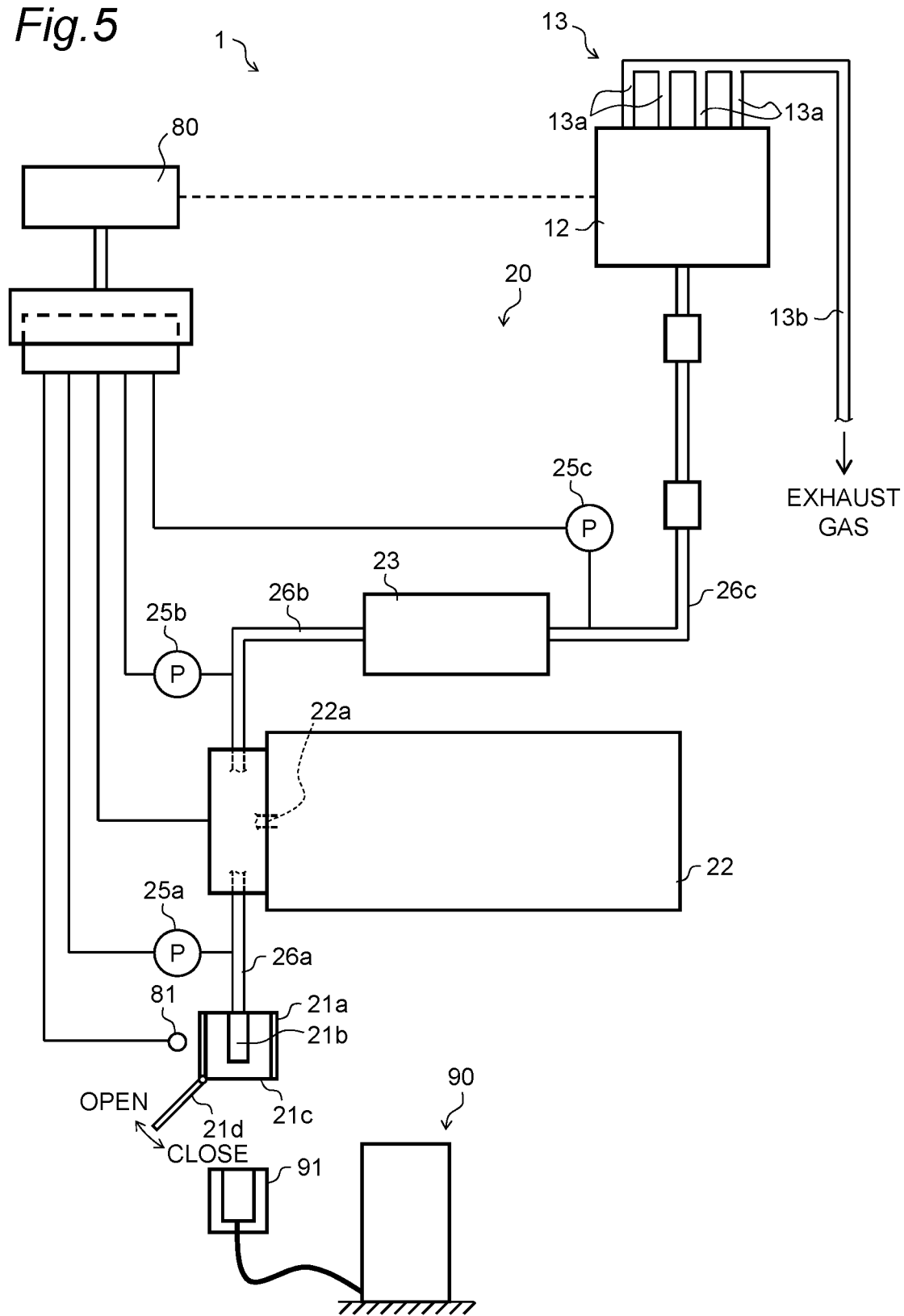

VEHICLE

BACKGROUND OF THE INVENTION

Field of the Invention

The present invention relates to a vehicle.

Related Art

US 2010/0025127 A1 discloses a vehicle including a connection portion to which a supply unit for supplying hydrogen fuel is connected. The connection portion is provided on one side surface in a width direction of the vehicle. For this reason, a fuel supply system including the connection portion easily comes into contact with an external obstacle.

SUMMARY OF THE INVENTION

An object of the present disclosure is to provide a vehicle equipped with a fuel supply system that is less likely to come into contact with an obstacle from the outside of the vehicle.

One aspect of the present disclosure provides a vehicle comprising a fuel tank in which fuel gas is stored, a cargo bed provided at a rear portion of the vehicle and exposed to an outside of the vehicle, and a connection portion that is connectable to a fuel filling device installed outside the vehicle, supplies the fuel gas supplied from the fuel filling device to the fuel tank, and is arranged further inward in a width direction than a side surface of the vehicle. The connection portion is arranged further on inward in the width direction than an outer end in the width direction of the cargo bed, and the connection portion includes a filling port into which the fuel filling device is inserted, and the filling port is directed rearward.

According to the above configuration, the connection portion is arranged further on inward in the width direction than a side surface of the vehicle, that is, the outer end in the width direction of the cargo bed. For this reason, a fuel system is less likely to come into contact with an obstacle from the side of the vehicle. This is particularly advantageous for an irregular ground traveling vehicle that frequently travels off-road.

BRIEF DESCRIPTION OF THE DRAWINGS

FIG. 5 is a conceptual diagram illustrating a fuel system and a drive system mounted on the irregular ground traveling vehicle.

DETAILED DESCRIPTION OF THE EMBODIMENTS

Figure 1:
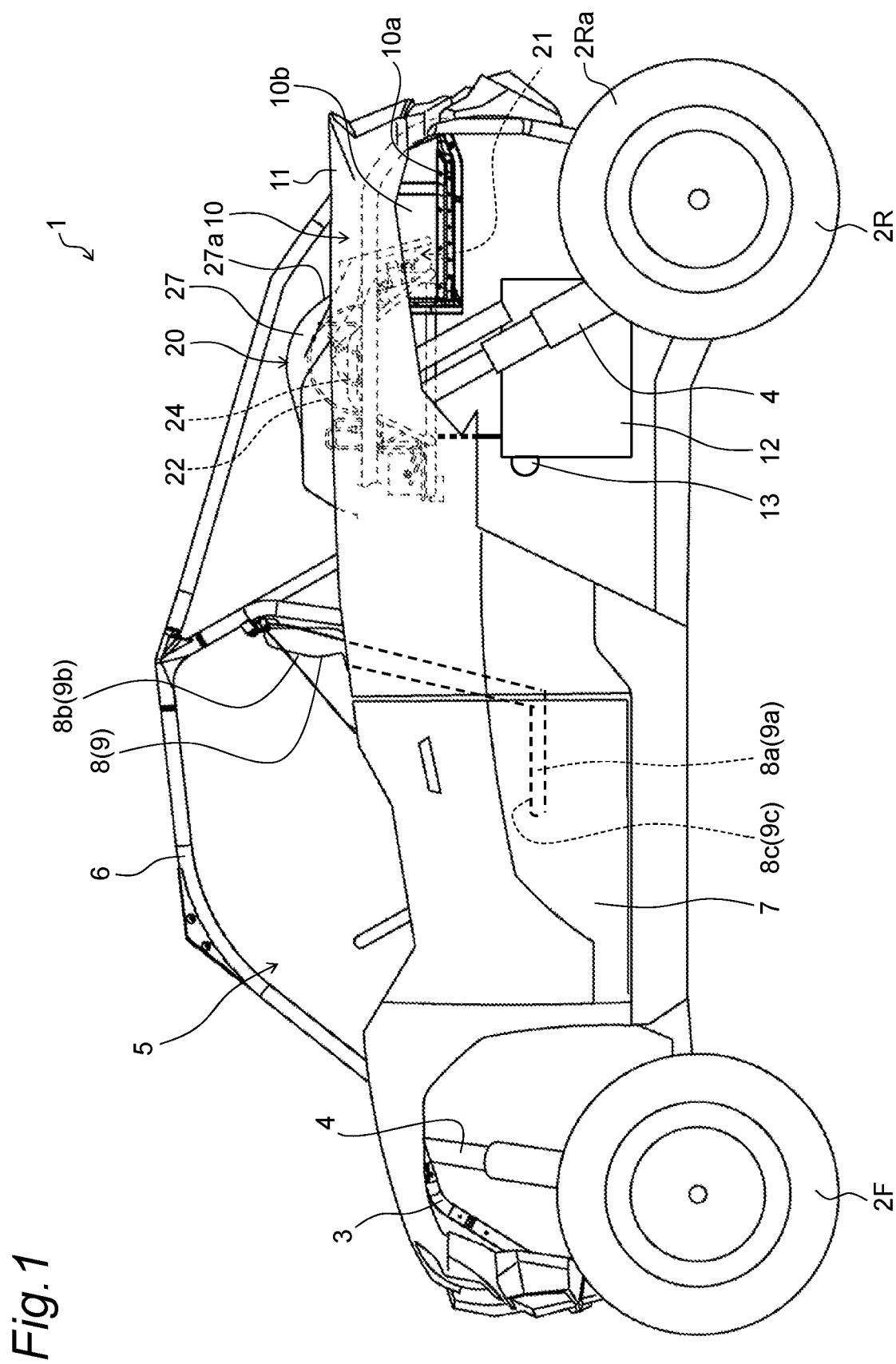
FIG. 1 is a left side view of an irregular ground traveling vehicle as an example of a vehicle according to an embodiment.

Hereinafter, an embodiment will be described with reference to the drawings. The same or corresponding elements are denoted by the same reference numerals throughout the drawings, and repetition of detailed description will be omitted. A front-rear direction corresponds to a longitudinal direction of a vehicle, and a left-right direction corresponds to a width direction of the vehicle. The embodiment will be described by exemplifying a case in which the vehicle is a wheeled vehicle provided with wheels and movable on the land, particularly an irregular ground traveling vehicle. However, the present invention can also be applied to a wheeled vehicle other than an irregular ground traveling vehicle such as a four-wheeled vehicle and a motorcycle used for public road traveling, and can also be applied to a vehicle other than a wheeled vehicle such as a tracked vehicle (for example, a construction machine) that has an endless track instead of wheels and can move on land, a ship (for example, a personal watercraft) that moves on water, and an aircraft (for example, a rotorcraft) that moves in the air. The vehicle may be a manned vehicle operated by a driver, or may be an unmanned vehicle capable of self-traveling without a driver.

Figure 2:
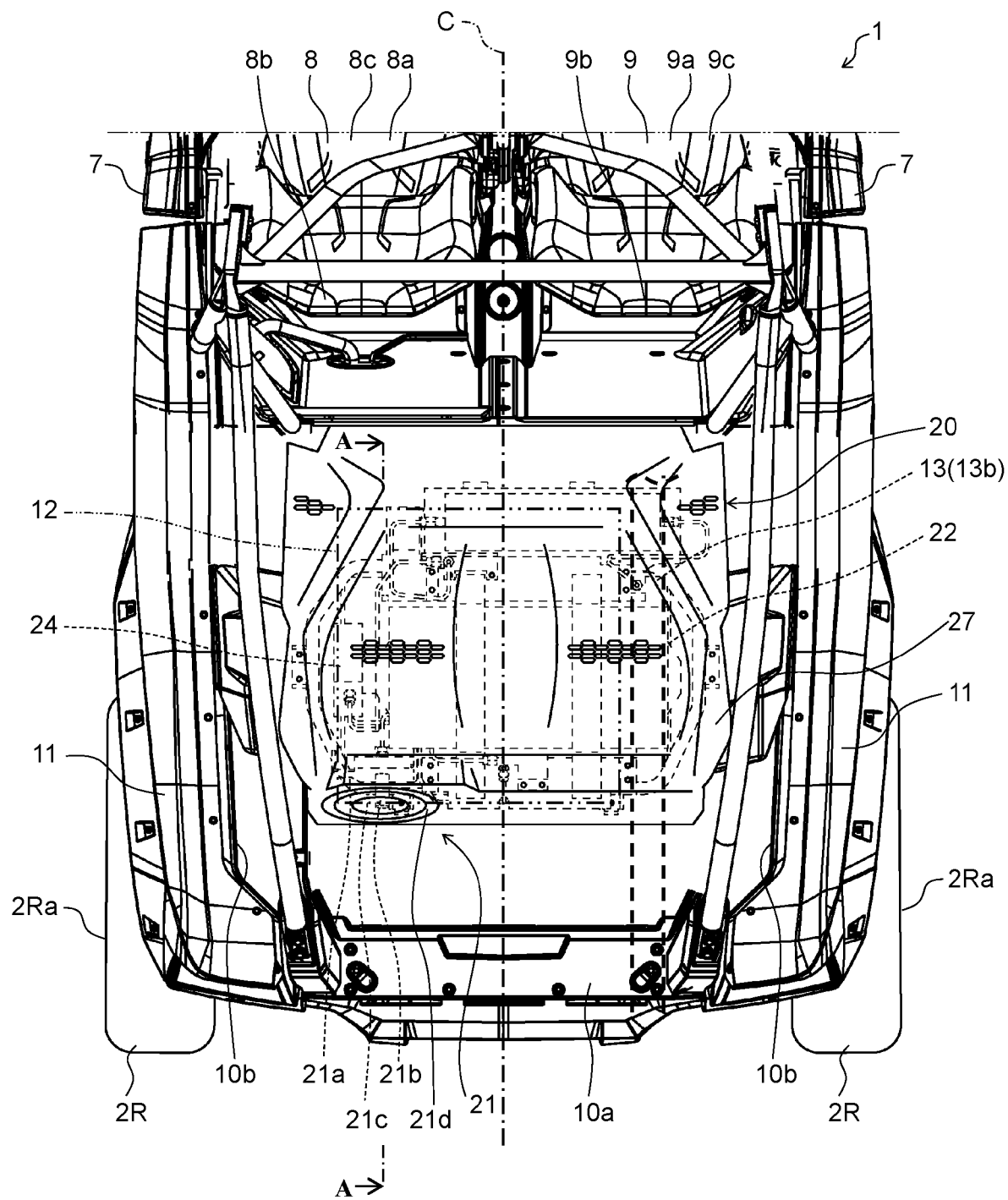
FIG. 2 is a plan view of the irregular ground traveling vehicle.
Figure 3:
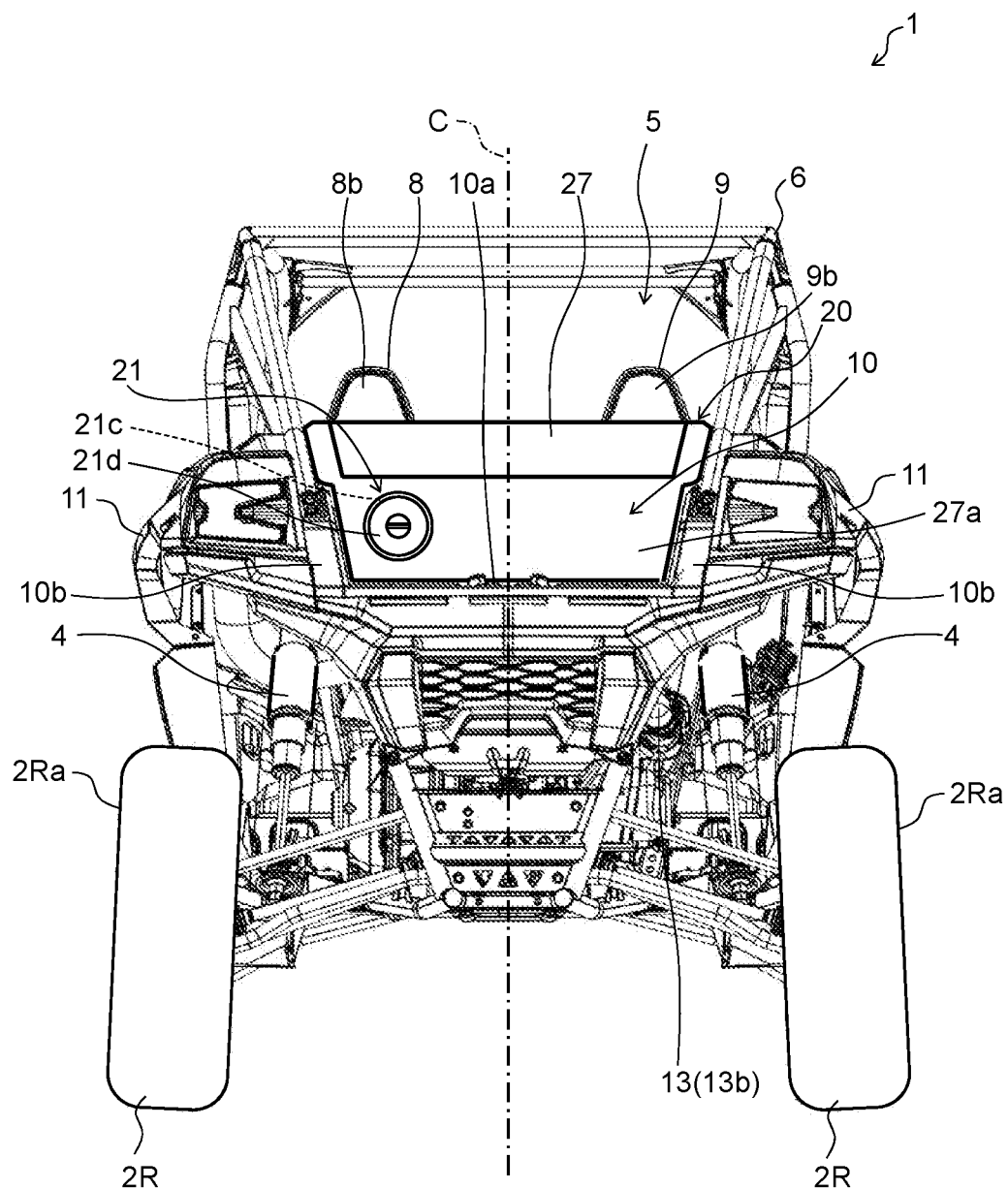
FIG. 3 is a rear view of the irregular ground traveling vehicle.
Figure 4:
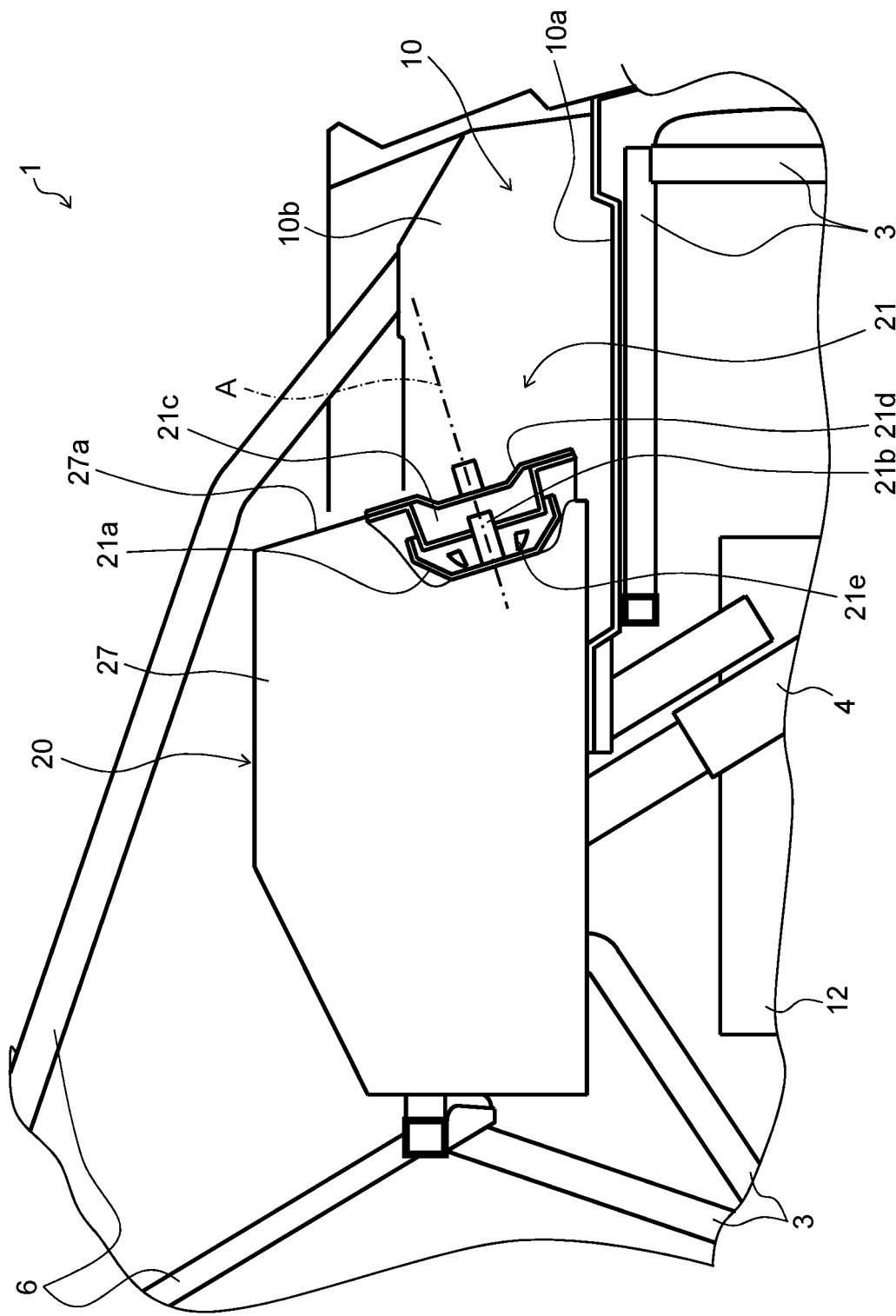
FIG. 4 is a cross-sectional view taken along line A-A of FIG. 2.

Referring to FIGS. 1 to 3, an irregular ground traveling vehicle 1 is a type of a wheeled vehicle, and includes four wheels 2F and 2R. The four wheels 2F and 2R includes a pair of left and right front wheels 2F and a pair of left and right rear wheels 2R. Each of the wheels 2F and 2R is mounted with a balloon tire filled with low-pressure air to improve off-road traveling performance. Each of the wheels 2F and 2R is suspended on a vehicle body frame 3 via a corresponding suspension 4.

A boarding space 5 is formed between the front wheel 2F and the rear wheel 2R in a front-rear direction. The boarding space 5 is surrounded by a rollover protection structure (ROPS) 6 and a door 7. Two seats 8 and 9 are arranged side by side in the boarding space 5. The left side is a driver's seat 8 for a driver, and the right side is a passenger's seat 9 for a passenger.

The irregular ground traveling vehicle 1 includes a cargo bed 10 provided in a rear portion of the irregular ground traveling vehicle 1. The cargo bed 10 is exposed to the outside of the irregular ground traveling vehicle 1, and is arranged behind the boarding space 5 and above the rear wheel 2R. The cargo bed 10 is formed by a bottom wall portion 10a and a pair of side wall portions 10b, and is opened upward and backward. The cargo bed 10 is arranged between the left and right rear wheels 2R in the width direction. A pair of fenders 11 are attached to the outer sides of a pair of the side wall portions 10b in the width direction, and partially cover the left and right rear wheels 2R from above. Each of the fenders 11 forms appearance of the irregular ground traveling vehicle 1 together with an outer shell body in a side view.

Below the cargo bed 10, a drive unit 12 that generates energy for causing the irregular ground traveling vehicle 1 to travel and transmits a driving force to the wheels 2F and 2R is mounted. The drive unit 12 according to the present embodiment is operated by use of fuel gas. A fuel supply module 20 for supplying fuel gas to the drive unit 12 is installed on the cargo bed 10.

The drive unit 12 may include an internal combustion engine that burns fuel gas to generate a driving force. The drive unit 12 may include an electric motor that generates a driving force and a fuel cell that extracts electric power from chemical energy of fuel gas, and the fuel cell may be a power supply device of the electric motor. Examples of fuel gas include hydrogen fuel, natural gas containing methane or the like as a main component, and hydrocarbon gas containing propane, butane, or the like as a main component. Hereinafter, as a simple example, a case where the fuel gas is hydrogen fuel and the drive unit 12 is a reciprocating hydrogen gas engine that generates a driving force by burning the hydrogen fuel will be described.

As illustrated in FIG. 5, the fuel supply module 20 mounted on the irregular ground traveling vehicle 1 includes a connection portion 21, a fuel tank 22, a regulator 23, an on-off valve unit 24, a plurality of pressure sensors 25a to 25c, and a plurality of fuel pipes 26a to 26c.

The connection portion 21 is configured to be connectable to a fuel filling device 90 installed outside the irregular ground traveling vehicle 1 (for example, in a hydrogen gas station on the road side). The fuel filling device 90 has a cylindrical nozzle portion 91 through which fuel gas is pressure-fed. In the present embodiment, a communication device 81 is attached to the connection portion 21. A control device 80 mounted on the irregular ground traveling vehicle 1 is configured to be able to communicate with the fuel filling device 90 via the communication device 81 attached to the fuel supply module 20. The communication device 81 may be connected to the fuel filling device 90 in a wirelessly communicable manner, or by wire.

The fuel tank 22 has a fuel inlet through which fuel gas flows from the connection portion 21 into the fuel tank 22, and a fuel outlet through which fuel gas flows from the fuel tank 22 into the drive unit 12. The fuel inlet (tank inlet) and the fuel outlet (tank outlet) may be independent of each other. Note that supply of fuel gas to the fuel tank 22 is performed during stoppage in which fuel gas is not consumed by the drive unit 12. Since inflow and outflow are not performed at the same time, the fuel tank 22 may have a single fuel inlet and outlet port 22a serving as both the fuel inlet and the fuel outlet. In the present embodiment, a single fuel inlet and outlet port 22a is assumed to be formed.

The on-off valve unit 24 is attached on an outer surface of the fuel tank 22, and switches a connection state of the fuel tank 22 between a disconnected state, a first connection state, and a second connection state. In the disconnected state, the first fuel pipe 26a and the second fuel pipe 26b are disconnected from the fuel inlet and outlet port 22a. In the first connection state, the first fuel pipe 26a communicates with the fuel inlet and outlet port 22a, and the second fuel pipe 26b is disconnected from the fuel inlet and outlet port 22a. In the second connection state, the fuel inlet and outlet port 22a communicates with the second fuel pipe 26b, and the first fuel pipe 26a is disconnected from the fuel inlet and outlet port 22a. The on-off valve unit 24 includes one or more electromagnetic on-off valves and/or three-way valves, and the connection state is switched or set by the control device 80.

When the fuel filling device 90 is connected to the connection portion 21, the on-off valve unit 24 sets the connection state of the fuel tank 22 to the first connection state. Fuel gas is supplied from the fuel filling device 90 to the connection portion 21, and the fuel tank 22 is filled with fuel gas from the connection portion 21 via the first fuel pipe 26a, the on-off valve unit 24, and the fuel inlet and outlet port 22a. Based on a pressure value of fuel gas flowing through the first fuel pipe 26a detected by the first pressure sensor 25a, the control device 80 estimates a filling amount of fuel gas in the fuel tank 22. When the filling amount reaches a predetermined full filling value, this fact is transmitted from the control device 80 to the fuel filling device 90 via the communication device 81. In response to this, the fuel filling device 90 stops the supply of fuel gas to the nozzle portion 91. In this manner, oversupply of fuel gas is prevented in advance, and fuel gas supply operation is appropriately finished.

The connection portion 21 includes a lock mechanism 21e that maintains connection with the fuel filling device 90 during fuel filling. In this manner, when the fuel tank 22 is filled with high-pressure fuel gas, the fuel filling device 90 can be prevented from being separated from the connection portion 21 by pressure of fuel gas. The connection portion 21 is a portion mechanically connected between the irregular ground traveling vehicle 1 and the fuel filling device 90 outside the irregular ground traveling vehicle 1, and functions as an interface as a portion where fuel is transferred and information is exchanged between the irregular ground traveling vehicle 1 and the fuel filling device 90.

While the irregular ground traveling vehicle 1 is traveling, the on-off valve unit 24 sets the connection state of the fuel tank 22 to the second connection state, and fuel gas is supplied from the fuel tank 22 to the drive unit 12 via the on-off valve unit 24, the second fuel pipe 26b, the regulator 23, and the third fuel pipe 26c. The regulator 23 monitors primary pressure (a pressure value of fuel gas flowing through the second fuel pipe 26b) detected by the second pressure sensor 25b and secondary pressure (a pressure value of fuel gas flowing through the third fuel pipe 26c) detected by the third pressure sensor 25c, and regulates the secondary pressure to predetermined pressure. The regulated fuel gas is supplied to the drive unit 12, mixed with intake air, and burned in a combustion chamber.

Exhaust gas generated by combustion is led by an exhaust pipe 13. A hydrogen gas engine according to the present embodiment is a multi-cylinder engine. The exhaust pipe 13 includes a plurality of branch portions 13a corresponding to a plurality of cylinders, and a collected portion 13b in which a plurality of the branch portions 13a are collected to form a single line. The collected portion 13b is provided with a three-way catalyst and a muffler as necessary. A plurality of the branch portions 13a extend forward and rightward from a cylinder head of a hydrogen gas engine, and are assembled to each other at an upstream end of the collected portion 13b. The collected portion 13b is arranged on the right side with respect to a center line C in the width direction of the irregular ground traveling vehicle 1 and below the cargo bed 10, extends in the front-rear direction, and has a downstream end portion opened on the lower right side of a rear end of the cargo bed 10. Exhaust gas is discharged to the outer rear side of the irregular ground traveling vehicle 1 via a corresponding one of the branch portions 13a and the collected portion 13b. In description below, when arrangement of the exhaust pipe 13 is described in comparison with another element, the "exhaust pipe 13" refers to the collected portion 13b unless otherwise specified.

The fuel tank 22 is formed in a cylindrical shape, and is supported by a front end portion of the cargo bed 10 in a posture in which a central axis of the fuel tank 22 is directed in the width direction. The fuel inlet and outlet port 22a is provided at an axial end portion of the fuel tank 22, the on-off valve unit 24 is attached to the fuel tank 22 so as to cover the fuel inlet and outlet port 22a, and a pipe between the on-off valve unit 24 and the fuel inlet and outlet port 22a is shortened or omitted. The fuel tank 22 and the on-off valve unit 24 are covered and protected by a cover 27.

The connection portion 21 is provided on a rear surface of the cover 27. The connection portion 21 is arranged to be offset to one side in the width direction with respect to a center line in the width direction of the irregular ground traveling vehicle 1. In the present embodiment, as an example, the fuel inlet and outlet port 22a and the on-off valve unit 24 are provided in a left end portion which is one side in the width direction of the fuel tank 22, and are arranged on the same side as the connection portion 21 in the width direction with reference to a center line in the width direction. For this reason, the first fuel pipe 26a is shortened. The connection portion 21 is arranged on the same side as the driver's seat 8 in the width direction with reference to a center line in the width direction. For this reason, it is not necessary for a driver who gets off the driver's seat 8 to go around to the right side of the irregular ground traveling vehicle 1, and it is easy to access the connection portion 21 with the fuel filling device 90. Convenience of refueling operation by the driver is improved.

In the present embodiment, a sidewall 2Ra of a tire mounted on the rear wheel 2R forms the outermost end in the width direction of the entire irregular ground traveling vehicle 1. In a case where the wheels 2F and 2R are removed, the fenders 11 integrated with the side wall portions 10b, respectively, defining the cargo bed 10 forms the outermost end in the width direction. The connection portion 21 is arranged on the inner side in the width direction with respect to such a part while being arranged close to such a part in the front-rear direction. For this reason, the connection portion 21 can reduce the possibility of coming into contact with an obstacle from the side of the irregular ground traveling vehicle 1, and protection of the connection portion 21 is improved. Furthermore, the first fuel pipe 26a can be separated from the wheels 2F and 2R, and damage to the first fuel pipe 26a can be easily prevented. By preventing the connection portion 21 from coming into contact with an obstacle, for example, deformation of the connection portion 21 and the like can be prevented, and occurrence of a connection failure with the nozzle portion 91 of the fuel filling device 90 can be prevented. Further, for example, it is possible to easily prevent sand and pebbles from entering a periphery of the fuel filling port 21c.

The connection portion 21 is arranged inside the cargo bed 10 surrounded by side wall portions 10b, and a rear end portion of the ROPS 6 is joined to the side wall portions 10b. The ROPS 6 is a member for protecting the boarding space 5 and the cargo bed 10 inside the irregular ground traveling vehicle 1 when the irregular ground traveling vehicle 1 overturns. Even if the irregular ground traveling vehicle 1 overturns off road, it is possible to reduce the possibility that the connection portion 21 is damaged.

The connection portion 21 does not overlap the exhaust pipe 13 in plan view, and is arranged away from each other. Furthermore, the connection portion 21 is arranged on the left side with respect to a center line in the width direction, while the exhaust pipe 13 is arranged on the right side with respect to a center line in the width direction. As described above, since the connection portion 21 and the exhaust pipe 13 are arranged on the opposite sides in the width direction with respect to the center line in the width direction of the irregular ground traveling vehicle 1, the connection portion 21 can be protected from exhaust heat. The connection portion 21 may be arranged on the right side, and the exhaust pipe 13 may be arranged on the left side. Further, the connection portion 21 may partially overlap the exhaust pipe 13 in plan view. In this case, if the connection portion 21 is sufficiently separated from the exhaust pipe 13 in the vertical direction, the connection portion 21 is protected from exhaust heat. As in the present embodiment, the arrangement relationship in which the connection portion 21 is arranged above or more highly than the bottom wall portion 10a of the cargo bed 10 and the exhaust pipe 13 is arranged below the bottom wall portion 10a of the cargo bed 10 is an example of sufficient separation in the vertical direction, and the connection portion 21 is less likely to be affected by radiant heat from the exhaust pipe 13.

The cover 27 of the fuel supply module 20 is positioned at the back of the cargo bed 10. The fuel supply module 20 is arranged between the seats 8 and 9 and a bottom surface of the cargo bed 10 in the front-rear direction. For this reason, the rear end of the connection portion 21 is positioned in front of the rearmost end of a part group excluding the wheels 2F and 2R of the irregular ground traveling vehicle 1, for example, the rear end of the cargo bed 10. For this reason, it is possible to reduce the possibility that an obstacle scattered from the rear of the irregular ground traveling vehicle 1 reaches the connection portion 21, and protection of the connection portion 21 is enhanced.

The driver's seat 8 includes a seat bottom 8a and a backrest portion 8b extending upward from the rear end of the seat bottom 8a. In the present specification, an upper surface of the seat bottom 8a is a seat surface 8c on which a driver sits. The passenger's seat 9 is similarly configured and has a seat surface 9c on which a passenger sits. The seat surfaces 8c and 9c are at substantially the same height as the upper end of outer peripheral surfaces of the wheels 2F and 2R in the vertical direction, and are positioned higher than those in a general four-wheeled vehicle. For this reason, even in a case where the irregular ground traveling vehicle 1 travels on swampland, it is possible to reduce the possibility that the seats 8 and 9 are immersed in water and to provide comfort to a driver and a passenger. A bottom surface of the cargo bed 10 is positioned further above the seat surfaces 8c and 9c and the upper ends of the wheels 2F and 2R, and the connection portion 21 is positioned further above the bottom surface of the cargo bed 10. Therefore, the risk of water immersion in the connection portion 21 is further reduced as compared with the seats 8 and 9. Further, since the bottom surface of the cargo bed 10 is arranged between the connection portion 21 and the wheels 2F and 2R, the possibility that gravel raised by the wheels 2F and 2R reaches the connection portion 21 is also reduced. Therefore, the connection portion 21 can be protected. By arranging the connection portion 21 above the bottom surface of the cargo bed 10, rainwater and sand remaining on the cargo bed 10 can be prevented from entering the fuel filling port 21c. Further, since the connection portion 21 is arranged further on the inner side in the width direction than a frame constituting the cargo bed 10, it is possible to further enhance a protection effect against an obstacle.

The cover 27 of the fuel supply module 20 has a rear wall portion 27a. The rear wall portion 27a is inclined rearward toward the lower side. The connection portion 21 is arranged along the inclination of the rear wall portion 27a of the cover 27. A rear end surface of the fuel filling port 21c is substantially flush with a surface of the rear wall portion 27a of the cover 27.

The connection portion 21 includes a cylindrical portion 21a formed in a recessed shape and a plug portion 21b extending on a central axis of the cylindrical portion 21a inside the cylindrical portion 21a. The cylindrical portion 21a forms a fuel filling port 21c opened outward (rearward in the present embodiment). The fuel filling port 21c is opened and closed by a lid 21d, and can be closed by the lid 21d while refueling operation is not performed, and protection is further improved. The nozzle portion 91 having a cylindrical shape of the fuel filling device 90 is externally fitted to the plug portion 21b and internally fitted to the cylindrical portion 21a. The filling port 21c of connection portion 21 is directed rearward. Since the cargo bed 10 is opened rearward, the user can easily access the connection portion 21 even if the fuel supply module 20 is arranged at the back of the cargo bed 10, and convenience for refueling operation is high.

An axis A of the filling port 21c of the connection portion 21 is slightly inclined with respect to the horizontal direction so as to be directed more upward toward a rear side. In other words, the axis A extends in a normal direction of a surface of the rear wall portion 27a of the cover 27. In order to access the connection portion 21, the user can directly insert the fuel filling device 90 once lifted into the connection portion 21 from above, which is highly convenient. Note that since the upper side of the cargo bed 10 is opened, such operation of the fuel filling device 90 is allowed.

The axis of alignment A of the filling port 21c of the connection portion 21 contains no or almost no component in the left-right direction. In other words, the axis A extends in a plane orthogonal to the width direction or in a plane slightly inclined about a vertical axis or a front-rear axis with respect to the plane. The user can insert the fuel filling device 90 into the connection portion 21 without turning the fuel filling device 90 sideways, and convenience of refueling operation is high. In particular, in a case where the side wall portion 10b of the cargo bed 10, the ROPS 6, the fenders 11, and the like are arranged on the outer side in the width direction of the connection portion 21, by which the connection portion 21 is protected, it is possible to prevent interference between the members contributing to the protection and the fuel filling device 90, which is particularly advantageous for enhancing convenience of refueling operation.

Although the embodiment of the present invention is described above, the above configuration can be appropriately changed, added, and/or deleted within the scope of the gist of the present invention.

In the above embodiment, two of the seats 8 and 9 are provided side by side in one row in the irregular ground traveling vehicle 1, but the number and arrangement of the seats are not limited to the above.

The direction and arrangement of the connection portion 21 can be changed. As an example, the connection portion 21 may be provided on an upper surface of the cover 27 and directed upward. Further, the connection portion 21 may be provided in a component other than the cover 27, and as an example, may be provided on the inner surface side of the side wall portion 10b of the cargo bed 10.

The connection portion 21 may be arranged on the side opposite to the driver's seat 8 side in the width direction, or may be arranged at a center position in the width direction. The connection portion 21 is preferably arranged inside the vehicle body frame 3 in the width direction. Since the connection portion 21 is provided facing the cargo bed 10, the nozzle portion 91 having a cylindrical shape and a hose portion of the fuel filling device 90 exposed from the connection portion 21 are located in a cargo bed region in a fuel filling state. In this manner, the nozzle portion 91 and the hose portion do not protrude in the width direction with respect to the side of the vehicle body. This prevents the nozzle portion 91 and the like from coming into contact with an operator or the like at the time of fuel filling. An axial direction (insertion direction) of the connection portion 21 is arranged so as to face obliquely upward toward the rear side, but may face in another direction. For example, the axial direction of the connection portion 21 may be set to the horizontal direction.

What is claimed is:

1. A vehicle comprising:
    a fuel tank in which fuel gas is stored;
    a cargo bed provided at a rear portion of the vehicle and exposed to an outside of the vehicle; and
    a connection portion connectable to a fuel filling device installed outside the vehicle to transfer the fuel gas supplied from the fuel filling device to the fuel tank, the connection portion being arranged further inward in a width direction than a side surface of the vehicle,
    wherein the connection portion is arranged further inwardly in the width direction than an outer end in the width direction of the cargo bed, and
    wherein the connection portion includes a filling port into which the fuel filling device is inserted, and the filling port is directed rearwardly.

2. The vehicle according to claim 1, wherein the connection portion is arranged further on a front side than a rear surface of the vehicle.

3. The vehicle according to claim 1, wherein the filling port is inclined so as to be directed more rearward toward an upper side.

4. The vehicle according to claim 1, wherein
    a direction of an axis of alignment of the filling port does not include a component in the width direction but includes a component in a front-rear direction.

5. The vehicle according to claim 1, wherein:
    the fuel tank is arranged on the cargo bed, and
    the connection portion is arranged higher than a bottom surface of the cargo bed.

6. The vehicle according to claim 1, further comprising a driver's seat on which a driver sits,
    wherein the connection portion is arranged higher than a seat surface of the driver's seat.

7. The vehicle according to claim 6, further comprising a passenger's seat provided side by side with the driver's seat in the width direction and on which a passenger sits,
    wherein the connection portion is arranged on the same side as the driver's seat in the width direction.

8. The vehicle according to claim 1, further comprising:
    an internal combustion engine configured to generate power by combusting the fuel gas; and
    an exhaust pipe to guide exhaust gas from the internal combustion engine,
    wherein the connection portion is arranged away from the exhaust pipe in a plan view.

9. The vehicle according to claim 8, wherein the connection portion and the exhaust pipe are arranged on opposite sides in the width direction with respect to a center line in the width direction of the vehicle.

10. The vehicle according to claim 1, wherein;
    the connection portion includes a cylindrical portion forming a space for receiving the fuel filling device, and a plug portion in the cylindrical portion and into which the fuel gas supplied from the fuel filling device received in the space flows, and
    the plug portion is connected to the fuel tank via a fuel pipe.

11. The vehicle according to claim 10, further comprising a valve unit interposed between the fuel pipe and the fuel tank and arranged on a first side in the width direction with respect to the center line in the width direction of the vehicle,
    wherein the connection portion is also arranged on the first side in the width direction.

12. The vehicle according to claim 1, further comprising left and right wheels, wherein the connection portion is arranged further inwardly in the width direction than the wheels.

13. The vehicle according to claim 1, wherein the fuel gas is hydrogen gas.

14. The vehicle according to claim 1, wherein the vehicle is an irregular ground traveling vehicle.

\* \* \* \* \*